No. 736,812. Patented August 18, 1903.

UNITED STATES PATENT OFFICE.

RUDOLF BORMANN, OF BERLIN, GERMANY.

SOLDER.

SPECIFICATION forming part of Letters Patent No. 736,812, dated August 18, 1903.

Application filed March 6, 1903. Serial No. 146,580. (No specimens.)

*To all whom it may concern:*

Be it known that I, RUDOLF BORMANN, a subject of the King of Prussia, German Emperor, residing at Rixdorf, Berlin, Germany, have invented certain new and useful Improvements in Solder, of which the following is a specification.

My invention relates to compositions for solder.

It has for its object to provide a compound adapted for this purpose which can be more economically and conveniently applied than those at present in use. These advantages will be hereinafter pointed out.

The uniting of metal objects by means of soft solder has hitherto been accomplished by first cleansing the portions to be united—for example, two metal bodies—by means of a known deoxidizing agent—*e. g.*, zinc chlorid or the like—and then heating the same with a soldering-iron, applying the solder to the seam, and melting the same. With this operation which has been in use for years, there are connected certain disadvantages—viz., the following: First, it is not possible to employ merely the exact quantity of solder necessary to effect the soldering, since in the soldering process a considerable excess of solder is always melted and drops off, which causes a great loss of solder, and it is evident that in consequence thereof an even distribution of the solder upon the parts to be united is impossible. A further disadvantage which comes especially into question for fine mechanics is that soldering-irons cannot be employed for manipulating small objects, and spirit or similar lamps must be employed, so that the solder stick, which always takes up a space many times as great as the objects to be united, cannot be brought close to the small articles to be soldered, and, moreover, these objects are spoiled by the melting solder. Consequently a need has for a long time been felt for a soldering agent obviating these disadvantages which may be spread upon the surfaces to be soldered and can be used merely in the necessary quantity.

The soldering agent forming the subject of the present invention consists of an intimate mixture of finely-powdered soft solder—tin, alloy, or the like—triturated to a paste, a deoxidizing agent—*e. g.*, zinc chlorid, ammonium chlorid, or both together—and a thickening body—such, for example, as cellulose—which burns easily and leaves no trace behind it. This complies with the necessary requirements, since a soldering material is thus obtained which can be spread on in a form hitherto unknown as a pasty fluid and has this striking advantage that it can be applied to the object to be soldered by means of a brush, so that there is a guarantee that the soldering material will be applied in the necessary quantity and will be very evenly distributed over the parts to be soldered. By this means these parts may be securely and intimately connected by simply heating them over a spirit or similar lamp. A further striking advantage of employing such a pasty fluid soft-solder material is that in a space of time incomparably shorter than what was hitherto possible quite a number of objects—particularly small objects—can be simultaneously soldered. One proceeds by first applying the soldering material with a brush to the articles to be soldered and then heating them one after another over a spirit-flame or the like. Also if on one article there are several places to be soldered these places can first be provided with a coating of the material, and consequently heated without the solder falling from the seam on the turning and manipulation of the article in flame of the lamp. This is prevented by exactly the necessary quantity of the soldering material being applied. As an example of the advantages of such a soldering material, which is especially applicable to small articles and for use by fine mechanics, may be given the fact that a spiral if provided with a layer of this material can be converted to a closed tube, since the solder is evenly distributed between the coils of the spiral and intimately secures the same one to another.

What I claim, and desire to secure by Letters Patent of the United States, is—

1. A liquid soft-soldering mass consisting of a mixture of a finely-pulverized soft-solder metal, triturated to a paste and a deoxidizing agent, together with a thickening substance, which burns without leaving any trace behind it, substantially as specified.

2. The composition of matter consisting of finely-pulverized tin, triturated to a paste, zinc chlorid and cellulose.

In testimony whereof I have hereunto set my hand in the presence of two witnesses.

RUDOLF BORMANN.

Witnesses:
 HUGO NELSON,
 JACOB CALLMAN.